(12) United States Patent
Walker et al.

(10) Patent No.: US 7,775,878 B2
(45) Date of Patent: *Aug. 17, 2010

(54) METHOD AND APPARATUS FOR PROVIDING INSURANCE POLICIES FOR GAMBLING LOSSES

(75) Inventors: Jay S. Walker, Ridgefield, CT (US);
James A. Jorasch, New York, NY (US);
Stephen C. Tulley, Fairfield, CT (US);
Michael D. Downs, Stamford, CT (US)

(73) Assignee: IGT, Reno, NV (US)

( * ) Notice: Subject to any disclaimer, the term of this patent is extended or adjusted under 35 U.S.C. 154(b) by 178 days.

This patent is subject to a terminal disclaimer.

(21) Appl. No.: 11/676,919

(22) Filed: Feb. 20, 2007

(65) Prior Publication Data

US 2007/0142109 A1 Jun. 21, 2007

Related U.S. Application Data

(60) Continuation of application No. 11/008,554, filed on Dec. 9, 2004, now Pat. No. 7,494,416, which is a continuation-in-part of application No. 10/365,154, filed on Feb. 11, 2003, now Pat. No. 6,869,362, which is a continuation-in-part of application No. 09/816,017, filed on Mar. 23, 2001, now Pat. No. 6,561,903, which is a continuation of application No. 09/168,398, filed on Oct. 6, 1998, now Pat. No. 6,254,482, which is a division of application No. 08/804,060, filed on Feb. 21, 1997, now Pat. No. 6,113,493.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............... 463/25; 235/380; 340/323 R; 273/142 D; 273/143 R; 273/292; 463/20; 463/29; 463/46; 705/4; 705/5; 705/10; 705/35

(58) Field of Classification Search .......... 463/25, 463/29
See application file for complete search history.

(56) References Cited

U.S. PATENT DOCUMENTS 3,810,627 A 5/1974 Levy ............... 273/138 A (Continued)

OTHER PUBLICATIONS

Office Action for U.S. Appl. No. 11/008,554 dated Dec. 29, 2006, 11pp.

(Continued)

*Primary Examiner*—John M. Hotaling, II
*Assistant Examiner*—Paul A. D'Agostino
(74) *Attorney, Agent, or Firm*—K&L Gates LLP

(57) ABSTRACT

A system and method for providing a gambling loss insurance policy automatically computes insurance premiums and processes gambling sessions covered by the gambling loss insurance policies. The players may purchase the insurance policies using various means such as coins, earned winnings, or credit cards. The gambling loss insurance system provides a high level of flexibility for the players to define specific parameters of the insurance policy. Additionally, the players may purchase the insurance policies directly from the gaming machine, a custom terminal on casino floor, or cage personnel having access to a centralized network server.

35 Claims, 18 Drawing Sheets

U.S. PATENT DOCUMENTS

| | | | | |
|---|---|---|---|---|
| 3,909,002 | A | 9/1975 | Levy | 273/138 A |
| 4,669,731 | A | 6/1987 | Clarke | 273/143 R |
| 4,679,143 | A | 7/1987 | Hagiwara | 364/412 |
| 4,766,539 | A | 8/1988 | Fox | 364/401 |
| 5,178,390 | A | 1/1993 | Okada | 273/143 R |
| 5,179,517 | A | 1/1993 | Sarbin et al. | 364/410 |
| 5,320,356 | A | 6/1994 | Cauda | 273/292 |
| 5,483,444 | A | 1/1996 | Heintzeman et al. | 364/401 |
| 5,674,128 | A | 10/1997 | Holch et al. | 463/42 |
| 5,695,402 | A | 12/1997 | Stupak | 463/20 |
| 5,756,978 | A | 5/1998 | Soltesz et al. | |
| 5,766,075 | A | 6/1998 | Cook et al. | 463/25 |
| 5,910,048 | A | 6/1999 | Feinberg | 463/25 |
| 6,048,271 | A | 4/2000 | Barcelou | 463/48 |
| 6,113,493 | A | 9/2000 | Walker et al. | 463/25 |
| 6,254,482 | B1 | 7/2001 | Walker et al. | 463/25 |
| 6,270,409 | B1 | 8/2001 | Shuster | 463/20 |
| 6,368,216 | B1 | 4/2002 | Hedrick et al. | 463/20 |
| 6,561,903 | B2 | 5/2003 | Walker et al. | 463/25 |
| 6,869,362 | B2 | 3/2005 | Walker et al. | 463/25 |
| 7,035,811 | B2 | 4/2006 | Gorenstein | |
| 2003/0126049 | A1 | 7/2003 | Nagan et al. | |
| 2003/0211886 | A1 | 11/2003 | Buchanan et al. | 463/29 |
| 2003/0224854 | A1 | 12/2003 | Joao | |
| 2004/0058726 | A1 | 3/2004 | Klugman | |
| 2004/0229671 | A1 | 11/2004 | Stronach et al. | |

OTHER PUBLICATIONS

Office Action for U.S. Appl. No. 11/008,554 dated Jun. 1, 2007, 18pp.
Office Action for U.S. Appl. No. 11/423,166 dated Jun. 1, 2007, 12pp.
Office Action for U.S. Appl. No. 11/423,166 dated Dec. 28, 2007, 5pp.
Office Action for U.S. Appl. No. 11/423,168 dated Apr. 17, 2007, 9pp.
Office Action for U.S. Appl. No. 11/423,171 dated Apr. 17, 2007, 5pp.
Office Action for U.S. Appl. No. 10/365,154 dated Jan. 28, 2004, 4pp.
Office Action for U.S. Appl. No. 11/257,245 dated Apr. 17, 2007, 10pp.
Notice of Allowability for U.S. Appl. No. 09/816,017 dated Sep. 5, 2002, 3pp.
Office Action for U.S. Appl. No. 09/816,017 dated Nov. 1, 2001, 5pp.
Office Action for U.S. Appl. No. 09/168,398 dated Apr. 14, 1999, 6pp.
Office Action for U.S. Appl. No. 09/168,398 dated Sep. 12, 2000, 6pp.
Office Action for U.S. Appl. No. 09/168,398 dated Dec. 22, 1999, 5pp.
Notice of Allowability for U.S. Appl. No. 09/168,398 dated Jan. 2, 2001, 3pp.
Office Action for U.S. Appl. No. 08/804,060 dated Aug. 26, 1999, 3pp.
Office Action for U.S. Appl. No. 08/804,060 dated Dec. 2, 1998, 5pp.
Office Action for U.S. Appl. No. 08/804,060 dated Aug. 7, 1998, 4pp.
Office Action for U.S. Appl. No. 08/804,060 dated Jul. 20, 1999, 1pg.
Office Action for U.S. Appl. No. 11/423,166 dated Dec. 29, 2006, 7pp.
Office Action for U.S. Appl. No. 11/423,171 dated Oct. 31, 2007, 8pp.
Notice of Allowability for U.S. Appl. No. 08/804,060 dated Apr. 25, 2000, 1pg.
Notice of Allowability for U.S. Appl. No. 10/365,154 dated Sep. 10, 2004, 4pp.
Office Action for U.S. Appl. No. 11/257,245 dated Sep. 21, 2007, 2pp.
Notice of Allowability for U.S. Appl. No. 11/257,245 dated Nov. 19, 2007, 2pp.
Office Action for U.S. Appl. No. 11/008,554 dated Oct. 11, 2007, 3pp.
Office Action for U.S. Appl. No. 11/008,554 dated Dec. 28, 2007, 5pp.
Office Action for U.S. Appl. No. 11/423,166 dated Oct. 10, 2007, 3pp.
Interview Summary for U.S. Appl. No. 08/804,060 dated Apr. 13, 2000, 2pp.
Office Action for U.S. Appl. No. 11/423,168 dated Nov. 27, 2007, 5pp.
Merriam-Webster's Collegiate Dictionary, Tenth Edition, 1998 pp. 70, 864, 3pp.
Office Action for U.S. Appl. No. 08/804,060 dated Aug. 7, 1998, 3pp.
Office Action for U.S. Appl. No. 08/804,060 dated Dec. 2, 1998, 4pp.
Office Action for U.S. Appl. No. 08/804,060 dated Jul. 20, 1999, 1pp.
Office Action for U.S. Appl. No. 08/804,060 dated Aug. 26, 1999, 2pp.
Notice of Allowability for U.S. Appl. No. 08/804,060 dated Apr. 20, 2000, 1pp.
Office Action for U.S. Appl. No. 10/365,154 dated Feb. 3, 2005, 2pp.
Notice of Allowance for U.S. Appl. No. 11/008,554 dated Jun. 9, 2008, 6pp.
Notice of Allowability for U.S. Appl. No. 09/816,017 dated Jan. 2, 2001, 1pp.
Office Action for U.S. Appl. No. 11/423,168 dated Apr. 7, 2008, 3pp.
Notice of Allowance for U.S. Appl. No. 11/423,166 dated Apr. 3, 2008, 5pp.
Office Action for U.S. Appl. No. 09/816,017 dated Apr. 4, 2003, 2pp.
Notice of Allowance for U.S. Appl. No. 09/816,017 dated Sep. 9, 2002, 3pp.
Office Action for U.S. Appl. No. 11/257,245 dated Aug. 8, 2007, 3pp.
Office Action for U.S. Appl. No. 11/423,171 dated Jul. 10, 2008, 7pp.
Office Action for U.S. Appl. No. 11/676,956 dated Aug. 6, 2008, 5pp.
Office Action for U.S. Appl. No. 11/676,835 dated Aug. 20, 2008, 5pp.
Office Action for U.S. Appl. No. 11/676,863 dated Aug. 6, 2008, 5pp.
Office Action for U.S. Appl. No. 11/676,889 dated Aug. 5, 2008, 5pp.
Office Action for U.S. Appl. No. 11/676,987 dated Aug. 20, 2008, 5pp.
Office Action for U.S. Appl. No. 09/816,017 dated Nov. 6, 2001.

| PLAYER ID 510 | NAME 520 | ADDRESS 530 | CREDIT CARD NUMBER 540 | LIFETIME WIN / (LOSS) 550 | AVERAGE WAGER PER PLAY 560 | AVERAGE SESSION LENGTH 570 |
|---|---|---|---|---|---|---|
| PL-246 | JOE SMITH | 1 ANY ST. CITY, USA | 1111-2222-3333-4444 | $210.50 | $1.00 | 48 MINS. |
| PL-135 | AL JONES | 22 MAIN ST. TOWN, USA | 2222-4444-6666-8888 | ($862.00) | $5.00 | 104 MINS. |
| PL-987 | MARY WHITE | 333 ELM ST. RURAL, USA | 3333-6666-9999-1111 | ($186.25) | $0.50 | 62 MINS. |
| PL-902 | JOHN BROWN | 4444 OAK ST. SUBURB, USA | 4444-5555-6666-7777 | $328.50 | $8.25 | 86 MINS. |

| INSURANCE TERM IDENTIFIER 610 | INSURANCE TERM DESCRIPTION 620 | PREMIUM COST 630 |
|---|---|---|
| TERM-001 | REFUND 100% OF NET LOSSES (UP TO $100) FOR THE FIRST 30 MINUTES OF GAME PLAY ON ANY $1.00 SLOT MACHINE | $79.00 |
| TERM-002 | REFUND 50% OF NET LOSSES (UP TO $200) FOR THE FIRST 20 MINUTES OF GAME PLAY ON ANY $5.00 "CRAZY 7'S" SLOT MACHINE | $48.00 |
| ○○○ | ○○○ | ○○○ |
| TERM-101 | REFUND 50% OF NET LOSSES (UP TO $100) FOR THE FIRST 250 HANDS OF GAME PLAY ON ANY $1.00 VIDEO POKER MACHINE | $39.00 |
| TERM-102 | REFUND 50% OF NET LOSSES (UP TO $50) FOR 24 HOURS OR 3,000 HANDLE-PULLS ON ANY $0.25 SLOT MACHINE | $26.00 |
| TERM-103 | REFUND 50% OF NET LOSSES (UP TO $350) FOR FIRST 90 MINUTES OF PLAY AT $25.00 MINIMUM BLACKJACK | $119.00 |
| ○○○ | ○○○ | ○○○ |
| TERM-201 | AS INSURANCE PAYMENT, THE CASINO WILL POST A CREDIT TO ANY OF YOUR MAJOR CREDIT CARDS | N/A |
| TERM-202 | AS INSURANCE PAYMENT, CURRENCY OR A VOUCHER WILL BE PROVIDED TO YOU AT YOUR MACHINE VIA THE MACHINE OR BY A MEMBER OF OUR CASINO STAFF | N/A |
| TERM-203 | AS INSURANCE PAYMENT, THE CASINO WILL MAIL A CHECK TO THE ADDRESS ON FILE WITH YOUR PLAYER TRACKING ACCOUNT ($2.00 MAILING FEE APPLIES) | N/A |

FIG. 6

| INSURANCE POLICY IDENTIFIER 710 | PLAYER IDENTIFIER 720 | TERM IDENTIFIER 1 730 | TERM IDENTIFIER 2 740 | TERM IDENTIFIER N 750 | TOTAL PREMIUM 760 | TOTAL AMOUNT OF COVERAGE 770 |
|---|---|---|---|---|---|---|
| POL-1234 | PL-246 | TERM-001 | TERM-202 | N/A | $79.00 | $100.00 MAX. |
| POL-1235 | PL-890 | TERM-111 | TERM-306 | TERM-099 | $36.00 | $50.00 MAX. |
| POL-1236 | PL-720 | TERM-283 | TERM-201 | N/A | $14.00 | $25.00 MAX. |
| POL-1237 | PL-308 | TERM-102 | TERM-203 | N/A | $26.00 | $50.00 MAX. |
| POL-1238 | PL-902 | TERM-153 | TERM-064 | TERM-103 | $196.00 | $375.00 MAX |

FIG. 7

| PLAYER IDENTIFIER 810 | SESSION IDENTIFIER 820 | AMOUNT WAGERED 830 | AMOUNT PAID OUT 840 | PLAYER NET WIN / (LOSS) 850 | SESSION START TIME / DATE 860 | SESSION END TIME / DATE 870 |
|---|---|---|---|---|---|---|
| PL-246 | SES-SM-6823 | $241.00 | $182.00 | ($59.00) | 14:33 07/03/2004 | 15:03 07/03/2004 |
| PL-892 | SES-SM-7048 | $184.50 | $216.75 | $32.50 | 14:38 07/03/2004 | 15:08 07/03/2004 |
| PL-308 | SES-SM-7073 | $216.00 | $280.00 | $64.00 | 14:44 07/03/2004 | 15:29 07/03/2004 |
| PL-902 | SES-SM-7108 | $84.25 | $39.75 | ($44.50) | 14:52 07/03/2004 | 15:38 07/03/2004 |
| PL-902 | SES-BJ-4678 | $785.00 | $625.00 | ($160.00) | 15:59 07/03/2004 | TBD |

| POLICY IDENTIFIER 910 | POLICY STATUS 920 | PLAYER QUALIFIED FOR INSURANCE PAYOUT? 930 | INSURANCE PAYOUT AMOUNT 1 940 | INSURANCE PAYOUT AMOUNT N 950 | INSURANCE PAYOUT METHOD 960 | INSURANCE PAYOUT TIME / DATE 970 |
|---|---|---|---|---|---|---|
| POL-1238 | OPEN | TBD | TBD | TBD | CHECK | N/A, TBD |
| POL-1234 | PAID | YES | $59.00 | $59.00 | VOUCHER | 15:03 07/03/2004 |
| POL-1230 | CLOSED | NO | $0.00 | $0.00 | N/A | N/A |
| POL-1224 | PAID | YES | $38.27 | TBD | POST TO CREDIT CARD | 13:38 07/03/2004 |

METHOD AND APPARATUS FOR PROVIDING INSURANCE POLICIES FOR GAMBLING LOSSES

The present application is a continuation of U.S. application Ser. No. 11/008,554, filed Dec. 9, 2004, now U.S. Pat. No. 7,494,416 which is a continuation-in-part application of U.S. patent application Ser. No. 10/365,154, entitled "Method And Apparatus For Providing Insurance Policies For Gambling Losses", filed Feb. 11, 2003 and issued as U.S. Pat. No. 6,869,362 on Mar. 22, 2005;

which is a continuation-in-part of U.S. patent application Ser. No. 09/816,017, entitled "System and Method for Generating and Executing Insurance Policies for Gambling Losses", filed on Mar. 23, 2001 and issued as U.S. Pat. No. 6,561,903 B2 on May 13, 2003;

which is a continuation of U.S. patent application Ser. No. 09/168,398 entitled "System and Method for Generating and Executing Insurance Policies for Gambling Losses", filed on Oct. 6, 1998 and issued as U.S. Pat. No. 6,254,482 B1 on Jul. 3, 2001;

which is a divisional of U.S. patent application Ser. No. 08/804,060 entitled "System and Method for Generating and Executing Insurance Policies for Gambling Losses", filed on Feb. 21, 1997 and issued as U.S. Pat. No. 6,113,493 on Sep. 5, 2000.

The content of each of these applications is incorporated herein by reference.

CROSS-REFERENCE TO RELATED APPLICATIONS

The present application is related to U.S. patent application Ser. No. 11/423,166 filed on Jun. 9, 2006 in the name of Walker et al. and entitled "METHOD AND APPARATUS FOR PROVIDING INSURANCE POLICIES FOR GAMBLING LOSSES".

The present application is related to U.S. patent application Ser. No. 11/423,168 filed on Jun. 9, 2006 in the name of Walker et al. and entitled "METHOD AND APPARATUS FOR PROVIDING INSURANCE POLICIES FOR GAMBLING LOSSES".

The present application is related to U.S. patent application Ser. No. 11/423,171 filed on Jun. 9, 2006 in the name of Walker et al. and entitled "METHOD AND APPARATUS FOR PROVIDING INSURANCE POLICIES FOR GAMBLING LOSSES".

The present application is related to U.S. patent application Ser. No. 11/676,835 filed concurrently herewith in the name of Walker et al. and entitled "METHOD AND APPARATUS FOR PROVIDING INSURANCE POLICIES FOR GAMBLING LOSSES".

The present application is related to U.S. patent application Ser. No. 11/676,987 filed concurrently herewith in the name of Walker et al. and entitled "METHOD AND APPARATUS FOR PROVIDING INSURANCE POLICIES FOR GAMBLING LOSSES".

The present application is related to U.S. patent application Ser. No. 11/676,974 filed concurrently herewith in the name of Walker et al. and entitled "METHOD AND APPARATUS FOR PROVIDING INSURANCE POLICIES FOR GAMBLING LOSSES".

The present application is related to U.S. patent application Ser. No. 11/676,956 filed concurrently herewith in the name of Walker et al. and entitled "METHOD AND APPARATUS FOR PROVIDING INSURANCE POLICIES FOR GAMBLING LOSSES".

The present application is related to U.S. patent application Ser. No. 11/676,919 filed concurrently herewith in the name of Walker et al. and entitled "METHOD AND APPARATUS FOR PROVIDING INSURANCE POLICIES FOR GAMBLING LOSSES".

The present application is related to U.S. patent application Ser. No. 11/676,889 concurrently herewith in the name of Walker et al. and entitled "METHOD AND APPARATUS FOR PROVIDING INSURANCE POLICIES FOR GAMBLING LOSSES".

The present application is related to U.S. patent application Ser. No. 11/676,863 concurrently herewith in the name of Walker et al. and entitled "METHOD AND APPARATUS FOR PROVIDING INSURANCE POLICIES FOR GAMBLING LOSSES".

The present application is related to U.S. patent application Ser. No. 11/676,763 filed concurrently herewith in the name of Walker et al. and entitled "METHOD AND APPARATUS FOR PROVIDING INSURANCE POLICIES FOR GAMBLING LOSSES".

BACKGROUND OF THE INVENTION

The present invention relates generally to gambling systems, and more particularly to a system and method for generating and executing insurance policies for gambling losses.

Gambling at casinos has long been a popular activity. Casinos offer a wide variety of games such as slot machines and table games. Some of the more common slot machines include standard reel machines, video poker, and keno machines. A conventional slot machine operates when a player inserts one or more coins, bills, or tokens into a coin acceptor and plays the game by pulling a handle or pushing a button. In many instances, the slot machines are connected to a network with a centralized tracking system.

Regardless of the particular type of game, gambling generally exposes the players to unpredictable gambling losses. Once a player starts gambling, it is sometimes hard for the player to keep accurate track of the amount of gambling losses, and even players that can do so sometimes find it hard to control the urge to continue playing. Thus, gambling may result in a substantial financial loss to the player.

It is known in the art to provide insurance policies against certain types of gambling losses. One system for providing such gambling loss insurance is described in U.S. Pat. No. 5,178,390 (Okada). This patent describes a slot machine that offers insurance by having the player insert coins into a coin acceptor dedicated to insurance payments. Thereafter, the slot machine provides a payout to the player depending on whether the machine has paid any jackpots over a given number of handle pulls. The payout, however, is not directly related to the amount of gambling losses, and the insurance protection applies only to a particular machine from which the insurance was purchased. Therefore, the player not only has limited flexibility in defining the policy requirements, the player must play at a particular machine during the entire insurance coverage period.

Another patent, U.S. Pat. No. 4,669,731 (Clarke), teaches a slot machine that pays out to the player when a predetermined number of consecutive games are lost. Similar to the Okada patent, however, the protection is not transferable between various slot machines, and the player cannot define the requirements of the protection, such as amount of losses.

Accordingly, not only are these systems restrictive in defining the type and scope of the insurance protection, they do not offer avenues for individuals to play different types of games at different locations under a single insurance coverage.

Instead, the players must purchase the insurance at the particular machine at which they will play throughout the entire insurance coverage period. Additionally, once the player initiates the insurance period, the player does not have an option to suspend the gambling session. Thus, these systems not only provide limited protection against gambling losses, they also significantly limit the games that may be played while covered by an insurance policy.

Therefore, it is desirable to provide protection against unpredictable gambling losses with flexible insurance policies.

It is also desirable to offer insurance protection enabling players the freedom to move between slot machines while maintaining a high level of playing enjoyment.

It is further desirable to provide a method of procuring gambling loss insurance through commonly accessible means such as credit cards.

SUMMARY OF THE INVENTION

Systems and methods consistent with the present invention automatically determine appropriate premiums for gambling insurance policies, and provide convenient distribution and administration of those policies.

Specifically, a system for providing a gambling loss insurance policy consistent with this invention comprises a game terminal and a game server. The game terminal includes processing means, user input means, and a display. The processing means executes a game. The user input means receives a user ID, game information, and policy requirements for the gambling insurance policy. The display displays game results and information relating to the gambling insurance policy. Moreover, the game server includes a receiving means, a determining means, and a transmitting means. The receiving means receives the policy requirements from the game terminal and the determining means determines a premium cost based on the policy requirements. Finally, the transmitting means transmits the premium cost to the user.

A method for providing a gambling loss insurance policy consistent with this invention comprises several steps. Initially, a game terminal receives a user ID and policy requirements for the gambling insurance policy from the user. The game terminal transmits the user ID and the policy requirements to a game server, which then determines a premium cost based on the policy requirements. Finally, the game server transmits the cost of the premium to the user at the game terminal.

BRIEF DESCRIPTION OF THE DRAWINGS

The accompanying drawings, which are incorporated in and constitute a part of this specification, illustrate the invention, and together with the description serve to explain the principles of the invention.

FIG. 5 is a detailed block diagram of the slot machine in FIG. 1;

FIG. 6 is a flowchart illustrating a preferred process for selecting policy requirements;

FIG. 7 is a flowchart illustrating a preferred process for calculating an insurance premium;

FIG. 8 is a flowchart illustrating a preferred process for finalizing the purchase of the insurance policy;

FIG. 9 is a flowchart illustrating a preferred process for system maintenance of active insurance policies;

DETAILED DESCRIPTION

Reference will now be made in detail to preferred embodiments consistent with the invention, examples of which are illustrated in the accompanying drawings.

System Architecture

Figure 1:
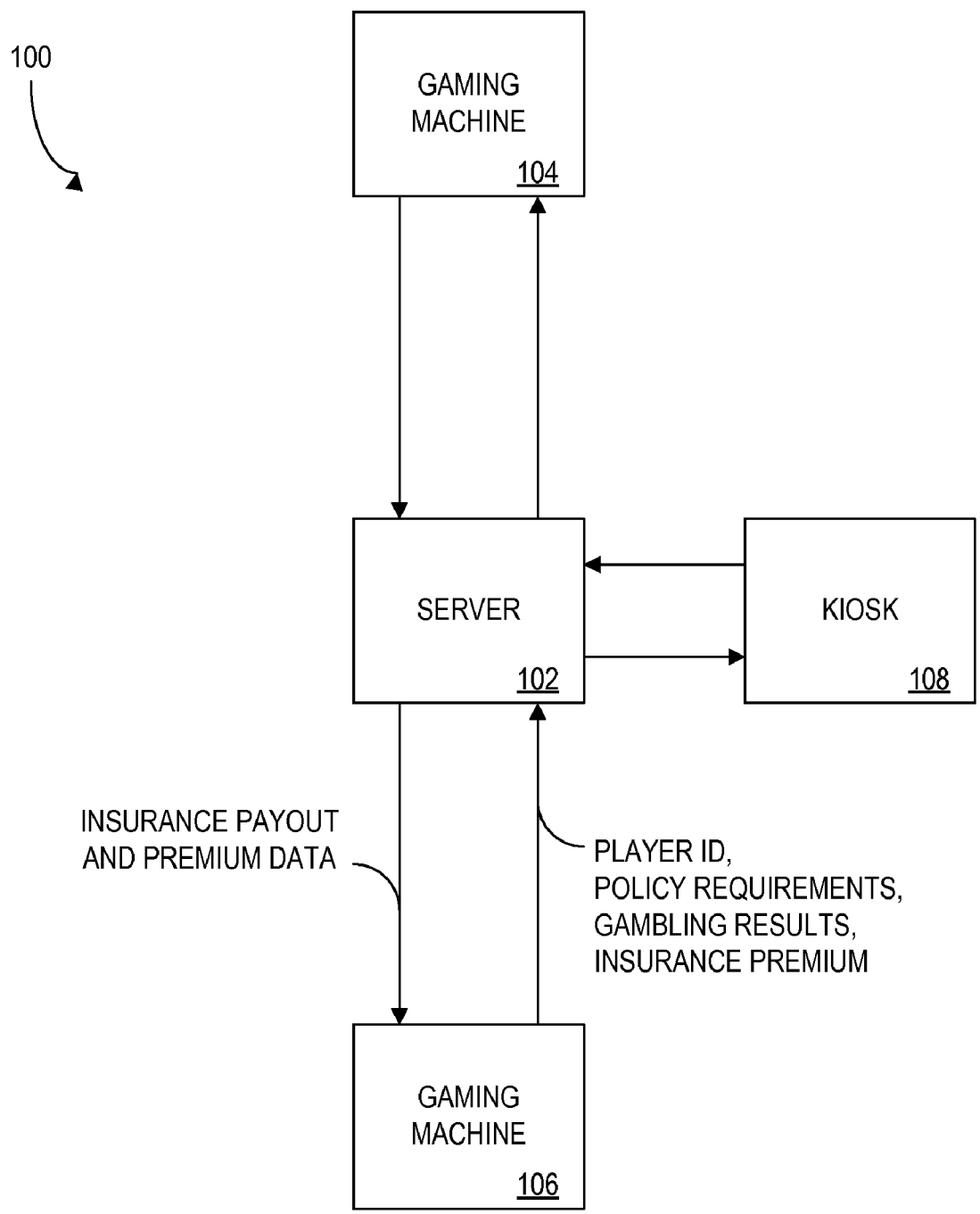
FIG. 1 is a block diagram of a gaming system consistent with the present invention.

FIG. 1 shows a gaming system consistent with the present invention having a network server 200 and a slot machine 500. Slot machine 500 is only one example of a gaming machine, and one skilled in the art may easily substitute slot machine 500 with other types of gaming machines. Network server 200 is preferably a conventional server computer and slot machine 500 is a conventional slot machine. Although FIG. 1 shows only one slot machine 500 connected to network server 200, several slot machines 500 and/or other gaming machines may connect to network server 200.

In operation, slot machine 500 transmits to network server 200 information such as player ID number, policy requirements, insurance premiums, and gambling results. Network server 200 transmits to slot machine 500 information such as insurance premium and payout data.

Figure 2:
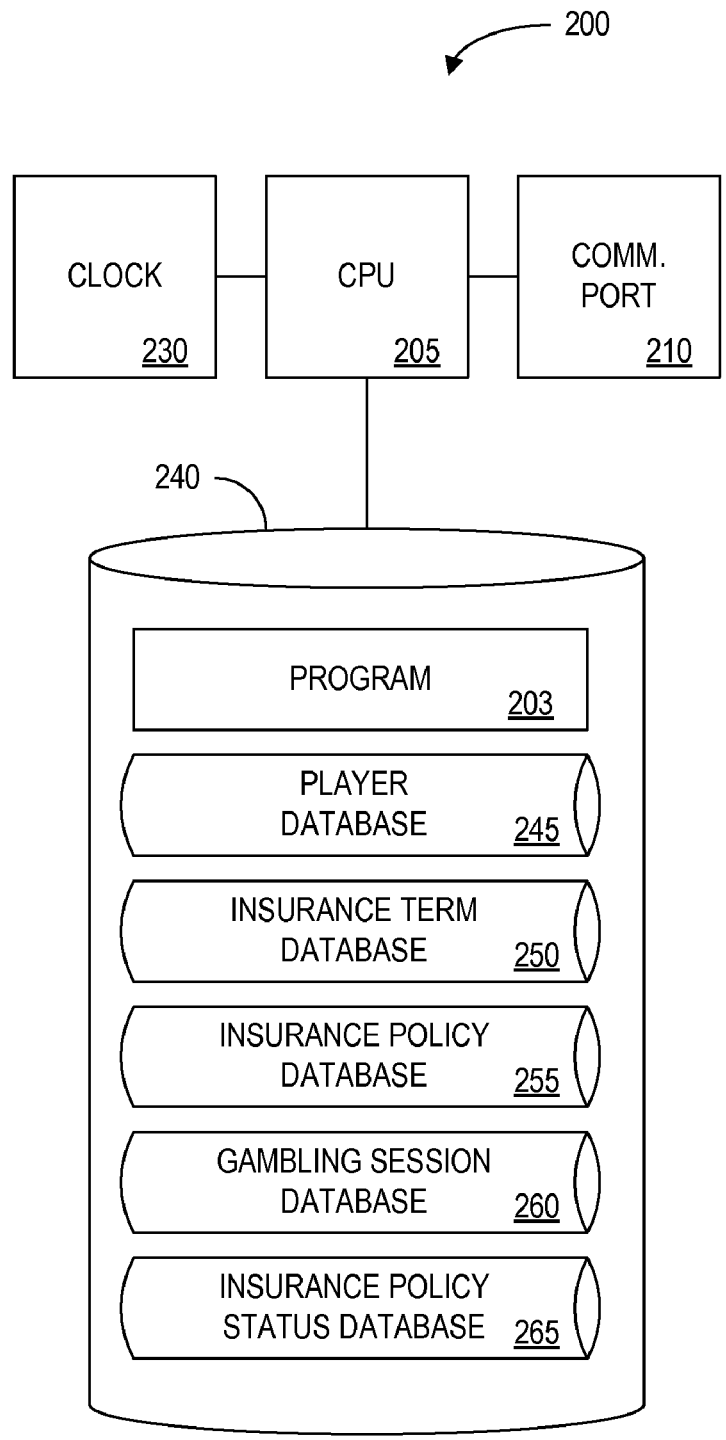
FIG. 2 is a detailed block diagram of the network server in FIG. 1.

FIG. 2 shows a detailed block diagram of network server 200. Network server 200 preferably includes a central processing unit (CPU) 205, a communication port 210, a random access memory (RAM) 215, a read-only memory (ROM) 220, a clock 225, and a data storage device 240. All of these later elements are connected to CPU 205 to facilitate the operation of server 200.

In the example shown, network server 200 receives and transmits information using an interface 230. Server 200 may be configured in many different ways. For example, network server 200 may be a conventional server computer such as an RS 6000 manufactured by IBM Corporation. Alternatively, the function of server 200 may be distributed across multiple computing systems as described below.

Data storage device 240 may include a hard magnetic disk drive, optical storage units, CD-ROM drives, or flash memory. In one embodiment, database software such as Oracle7, manufactured by Oracle Corporation, creates and manages these databases. Data storage device 240 contains databases used in processing transactions in accordance with the present invention, including a player database 245 and an insurance database 250. Insurance premium calculation algorithms (not shown) are preferably stored in storage device 240 and executed by CPU 205.

Figure 3:
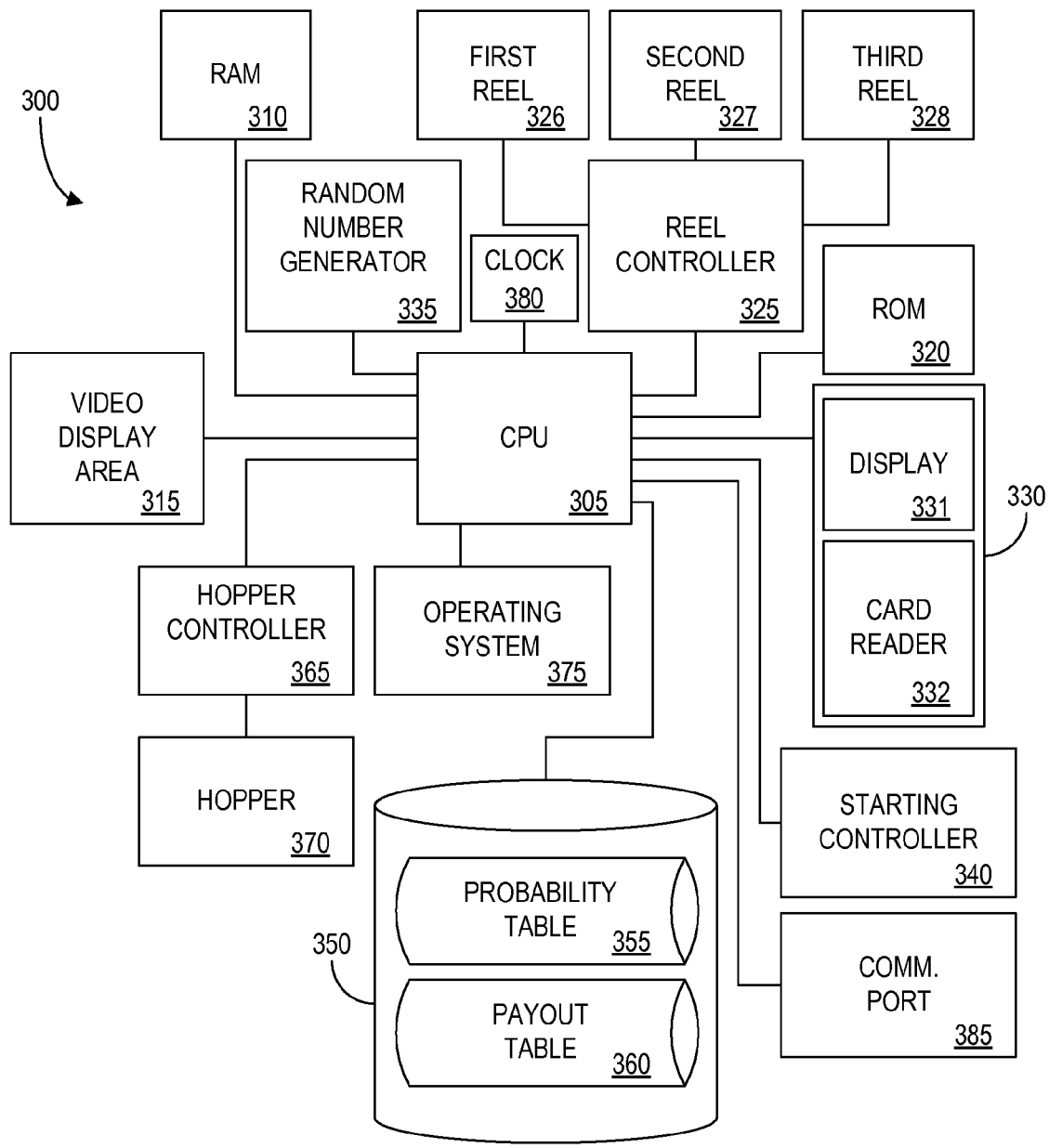
FIG. 3 is a table illustrating the data structure of a player database in the data storage device of FIG. 2.

FIG. 3 shows an example of the organization of player database 245, which maintains data about the players. Database 245 includes multiple records 245a-c, each record including fields specific to a player, such as name, player ID, address, credit card number, credit card expiration date, earned payout, preferred payment method, and insurance policy tracking number.

Figure 4:
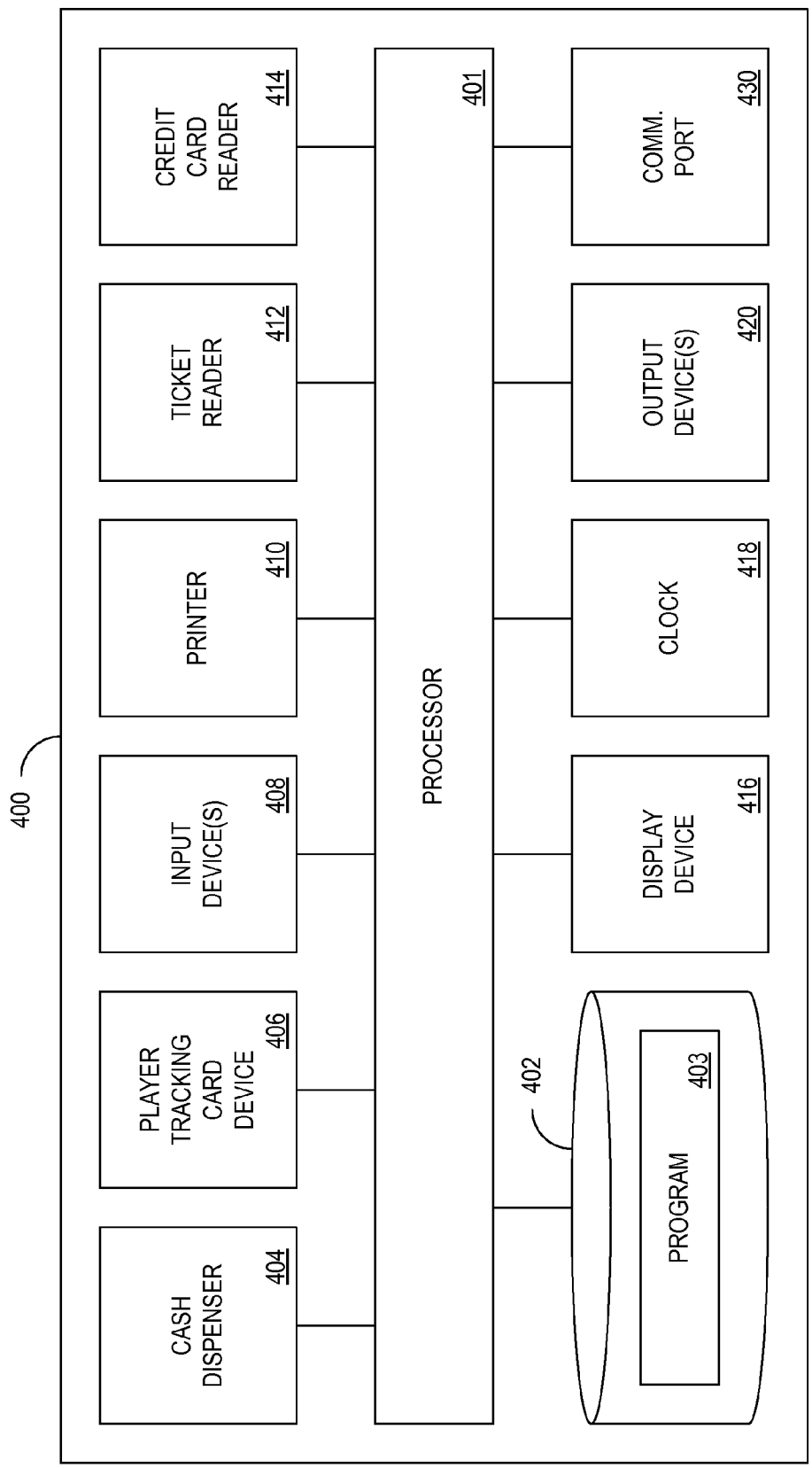
FIG. 4 is a table illustrating the data structure of an insurance database in the data storage device of FIG. 2.

FIG. 4 shows an example of the organization of insurance database 250, which maintains data on insurance policies generated by the players. Database 250 includes multiple records 250a-c, each record including fields specific to a player such as player ID, policy tracking number, coverage type, premium amount, loss threshold, coverage period, coverage amount, status, and gambling session results.

Interface 230 connects network server 200 to a network of slot machines 500 and/or other gaming machines. Interface 230 also connects to communications port 210.

Network server 200 may also be configured in a distributed architecture, wherein databases and processors are housed in separate units or locations. Some such servers perform primary processing functions and contain at a minimum, a RAM, a ROM, and a general processor. In such an embodiment, each of these servers is attached to a wide-area network (WAN) hub that serves as a primary communication link with the other servers and gaming machines. The WAN hub may have minimal processing capability itself, serving primarily as a communications router.

FIG. 5 shows a detailed block diagram of slot machine 500. Interface 230 connects slot machine 500 to network server 200. Slot machine 500 includes a CPU 505 connected to a RAM 510, a video display area 515, a ROM 520, a reel controller 525, a player card tracking device 530, a random number generator 535, a starting controller 540, interface 585, a data storage device 550, a hopper controller 565, hopper 570, an operating system 575 (typically comprising software stored in memory), and a clock 580. Data storage device 550 includes a probability table 555 and a payout table 560.

Slot machine 500 operates in a conventional manner. The player starts the machine by inserting a coin or using electronic credit, and initiating starting controller 540. Under control of a program stored, for example, in data storage device 550 or ROM 520, CPU 505 directs random number generator 535 to generate a random number. CPU 505 looks up the generated random number in stored probability table 555 and finds the corresponding outcome. Based on the identified outcome, CPU 505 locates the appropriate payout in the stored payout table 560. CPU 505 also directs reel controller 525 to spin reels 526, 527, 528 and to stop them at a point when they display a combination of symbols corresponding to the selected payout. When the player wins, the slot machine 500 stores the credit balance in RAM 510, and displays the balance in video display area 515.

Hopper controller 565 is connected to hopper 570 for dispensing coins. When the player requests to cash out by pushing a button on slot machine 500, CPU 505 checks RAM 510 to see whether the player has any credits and, if so, signals hopper controller 565 to release an appropriate number of coins into a coin tray (not shown).

In alternative embodiments, slot machine 500 does not include reel controller 525, and reels 526, 527, 528. Instead, video display area 515 graphically displays simulated representations of objects contained in the selected game, such as graphical reels or playing cards. These representations are preferably animated or displayed to simulate playing of the selected game.

Player card tracking device 530 includes display 531 and card reader 532. Players insert player tracking cards into card reader 532. Tracking cards can be plastic cards with magnetic strips electronically storing respective player ID numbers. Display 531 displays information concerning the use of player card tracking device 530, and allows communications to be displayed to the player regarding insurance policy requirements. Display 531 may be a touch screen display for receiving signals from the player concerning the selection of the requirements.

Alternatively, slot machine 500 or player card tracking device 530 may include one or more separate input buttons (not shown) for the players to select the policy requirements and provide other input such as a PIN. Credits earned during play are stored locally in RAM 510 and displayed in video display area 515. Slot machine 500 or player card tracking device 530 could also include one or more separate input devices for selecting the policy requirements.

In other embodiments, slot machine 500 recognizes the identity of players through player identification devices other than player card tracking device 530, thereby eliminating the need for players to carry player identification cards. For example, slot machine 500 could include a keypad, at which players enter either their player identification numbers or their names along with a secured password. Slot machine 500 could also include a device for measuring player biometrics (e.g., fingerprint, voice, or retinal detection) to identify players.

Commercially available player card tracking devices include, for example, the Mastercom device available from Bally Manufacturing. (See, for example, U.S. Pat. No. 5,429, 361 to Raven et al.). Such player tracking devices include a magnetic card reader and a numeric keypad for entry of player information.

System Operation

In one embodiment of this invention, a player registers in advance, for example, at a cashier's station, and obtains a tracking card. The tracking card may be a magnetically coded tracking card generally used at casinos, a stored value card, or other form of smart card. In the preferred embodiment, only the player ID number is stored on the player tracking card for security reasons. However, other types of information, such as monetary value, can also be stored on the player tracking card.

During registration, the player provides the various player information shown in FIG. 3, such as name, address, credit card number, and credit card expiration date. The casino assigns each player a unique numeric ID number. The player also provides preferred payment methods to define the preferred methods of receiving payouts under the policy which will be described in detail below. Additionally, the system maintains an indication of whether the player has an insurance policy. The player registration, as well as the purchase of insurance described below, may also take place at slot machine 500 or any game machine having an interactive interface.

FIG. 6 illustrates a process consistent with this invention for purchasing gambling loss insurance. Initially, the player inserts the tracking card into slot machine 500 (step 600). Card reader 532 of player card tracking device 530 reads the player ID stored on the player tracking card, and player card tracking device 530 transmits the player ID to network server 200 (step 610). Network server 200 looks up the player ID number in player database 245 and checks to see whether the player has an existing insurance policy (step 620). If the player has an existing policy, the player may either initiate a gambling session under that policy or purchase another policy.

Regardless of whether the player has a policy, display 531 presents to the player information giving the player an option to purchase a new or additional gambling loss insurance, at which point the player may elect to establish an insurance policy (step 630). Policy requirements may be established in various ways: entering data directly into a key pad attached to slot machine 500; entering data into a custom terminal on a casino floor; providing data to a cashier who enters the requirements directly into network server 200; or entering the data using a telephone, which then transmits the data to network server 200. For this embodiment, it will be assumed the insurance policy is purchased from slot machine 500.

Next, the player defines the type of coverage by establishing policy requirements of the insurance policy (step 640). The player determines the loss at which the insurance policy pays a claim, the amount of each bet, and the time period over which the insurance policy is in effect.

There are a number of ways in which the amount of coverage can be described (step 650). For example, an insurance policy with a stated loss limit of five hundred dollars provides a payment to the player if his losses for the covered gambling session exceed five hundred dollars. The payment could be made if losses exceed five hundred dollars at any time throughout the session, or only if losses exceed five hundred dollars at the conclusion of the covered gambling session. Alternatively, a graduated insurance payout scale could allow for insurance payouts to increase as the size of the loss increases. Rather than specifying an amount of loss, the insurance policy could instead describe a rate of loss, such as one hundred dollars per hour. Any insured gambling session in which losses exceeded one hundred dollars for a given one hour period would result in an insurance payout. Loss amounts could also represent a fraction of the amount of money gambled during the insured session. A forty percent loss limit, for example, would trigger an insurance payout when losses for the session exceed forty percent of the total amount bet during the session.

The player next describes the amount of each bet over the insured period (step 660). A slot machine player, for example, might indicate that he is playing a dollar machine and that he is playing three coins per handle pull. The player may also specify the type of slot machine that he is going to play in order to provide basic information about the standard deviation of the outcomes to the server.

After establishing an amount of loss to be covered, the player selects the coverage time of the policy (step 670). For example, the insurance policy could specify a start and stop time. Any gambling within this time window is covered by the policy. Alternatively, the player could select a number of handle pulls so that the insurance period is based on activity rather than time. For example, the player may establish a policy to cover the next one thousand handle pulls.

Insurance payouts can take a number of different forms. They can be a fixed dollar amount, a fraction of all losses above the loss limit, or a number of free plays on the machine.

Network server 200 stores the player selected coverage type and the selected loss threshold in insurance database 250. Slot machine 500 then transmits the policy requirements to network server 200 through network server interface 545.

FIG. 7 is a flowchart illustrating a process for calculating a premium cost consistent with this invention. First, network server 200 stores the policy requirements received from slot machine 500, along with the player ID, in insurance database 250 (step 700). CPU 205 accesses a premium calculation algorithm pre-stored in storage device 240 (step 710), and computes the premium costs based on the policy requirements (step 720). Although many different algorithms may be used to calculate the premium costs, insurance policies having a high level of protection will generally require higher premiums. If all else is equal, the premium amount increases as the amount of the insurance payout increases. An insurance policy which pays fifty dollars for any loss greater than five hundred dollars over a one hour period will generally cost twice as much as a policy which pays twenty five dollars for the same loss profile.

As loss limits increase, the premium amount declines, reflecting the decreased probability that the player loss will trigger an insurance payout.

Greater gambling activity will of course necessitate relatively higher insurance premiums. A doubling of the time period of coverage, for example, will increase the premium amount (although not necessarily linearly). Higher bet amounts per handle pull will also result in higher premium amounts. Insurance policies written on machines with relatively high payout variance will also require higher insurance premiums.

Once calculated, network server 200 transmits the premium cost to slot machine 500 (step 730) which then displays the premium cost on display 531 (step 740).

FIG. 8 is a flowchart illustrating a process consistent with the invention for finalizing the purchase of an insurance policy. The player evaluates the premium cost shown on display 531 and decides whether the premium is acceptable (step 800). If the premium is not acceptable to the player (step 810), the player may develop new policy requirements (step 820). For example, if the premium is too high, the player may increase the loss amount covered or shorten the time period covered by the policy. Network server 200 then calculates a new premium based on the modified policy requirements (step 825), as described in connection with FIG. 7. This new premium amount if then transmitted to slot machine 500 for display to the player.

If the premium is acceptable to the player (step 810), the player transmits an acceptance to network server 200, providing a confirmation to purchase the specified insurance policy (step 830). Network server 200 stores the premium amount in the premium amount field of insurance database 250. Next, network server 200 generates a tracking number and appends it to the insurance policy record as shown in FIG. 4 (step 840). Network server 200 receives the premium from the player by directly debiting the player's credit card account, accepting coins deposited by the player, or debiting the player's winnings accrued at slot machine 500 (step 850). Once sufficient payment is received for the premium, network server 200 stores the insurance policy record in insurance database 250 (step 855). At this point, network server 200 sets the status field of the insurance policy in insurance database 250 to "active" and adds the insurance policy tracking number to player database 245. Network server 200 also issues a policy tracking number and stores it in insurance database 250.

Network server 200 also performs maintenance checks to ensure that only active insurance policies are stored in insurance database 250. FIG. 9 is a flowchart illustrating a preferred process for maintaining active insurance policies. First, network server 200 makes periodic searches through insurance database 250, retrieving the coverage period of each insurance policy (step 900). CPU 205 checks whether the insurance has expired by comparing the coverage period with the current date and time (step 910). If the current date and time are beyond the coverage period, network server 200 changes the status field of the insurance policy from "active" to "expired" in insurance database 250 (step 920). This completes the insurance policy maintenance (step 930). For insurance policies with a period of coverage defined by number of handle pulls, CPU 205 checks to see whether the number of outcomes received exceeds the amount of coverage.

Figure 10A:
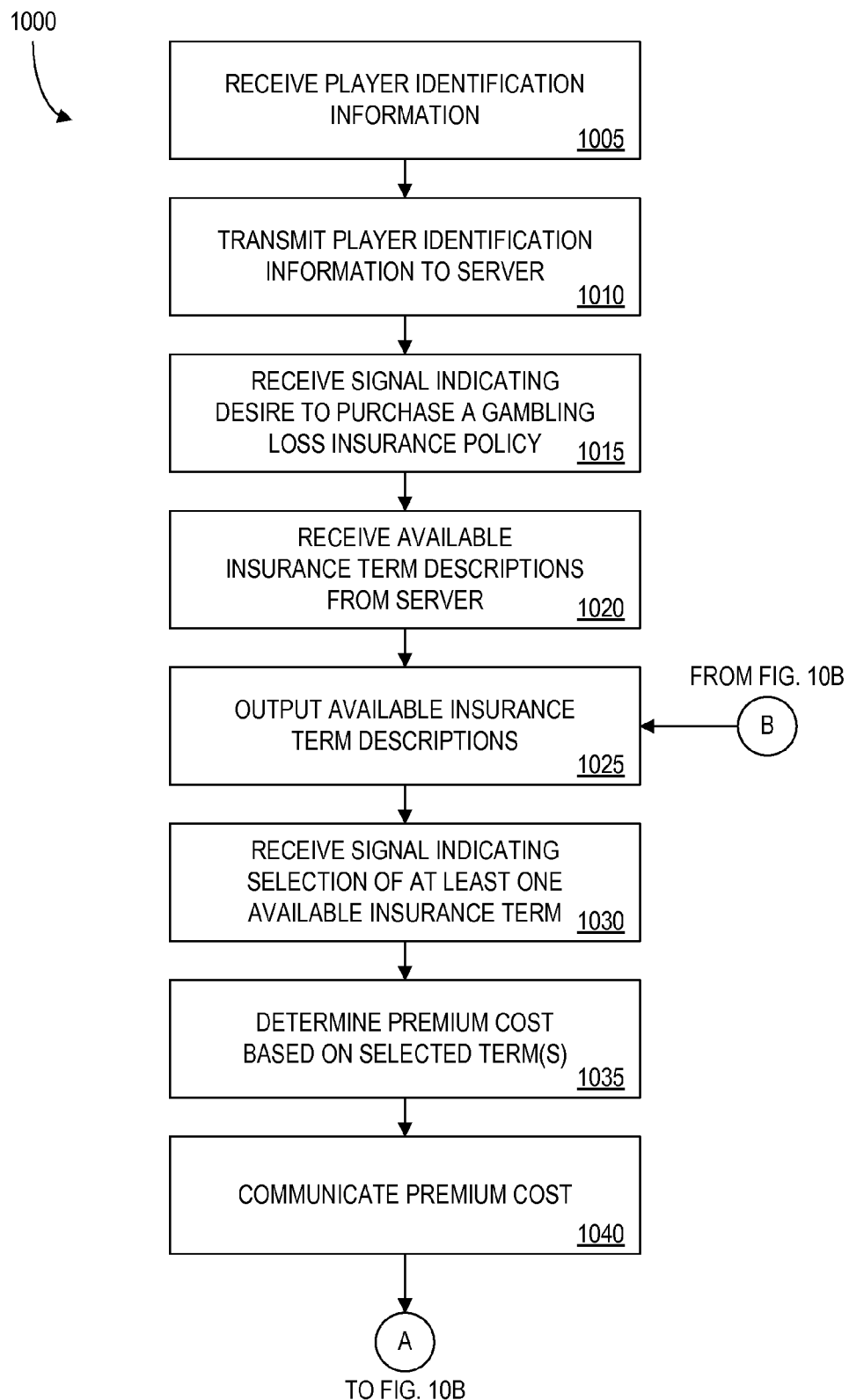
FIG. 10 is a flowchart illustrating a preferred process for processing a gambling session covered under the insurance policy.
Figure 10B:
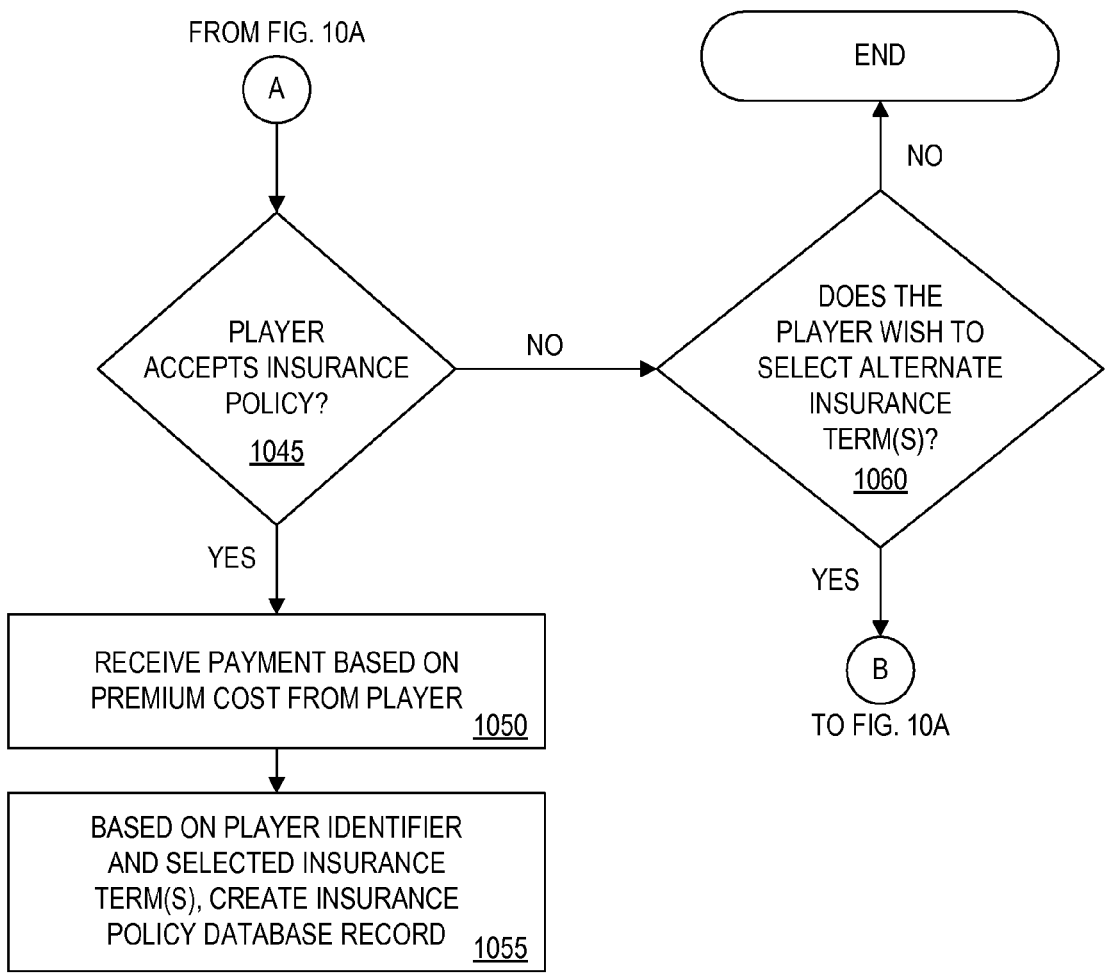

Once an "active" insurance policy is stored in insurance database 250, the player may conduct an insured gambling session under the insurance policy as shown in FIG. 10. To begin an insured gambling session, the player inserts the player tracking card into player card tracking device 530 of slot machine 500 (step 1000). Slot machine 500 then transmits the player ID number stored on the player tracking card to network server 200 (step 1010). If network server 200 determines that the player has an active insurance policy in insurance database 250, CPU 205 of network server 200 starts storing the player's gaming results in the results field of insurance database 250.

During a gaming session at slot machine 500, the player may choose to take a break and temporarily suspend the session without decreasing the coverage period. Additionally, the player is free to relocate to another machine or play a different game. To do so, the player simply selects a "suspend" option, at which point slot machine 500 transmits the current session record to network server 200. Thereafter, a new session record is initiated at another gaming machine. Regardless of the gaming machine, slot machine 500 transmits the tracked session record to network server 200 for processing at the end of each gaming session (step 1020).

Figure 11:
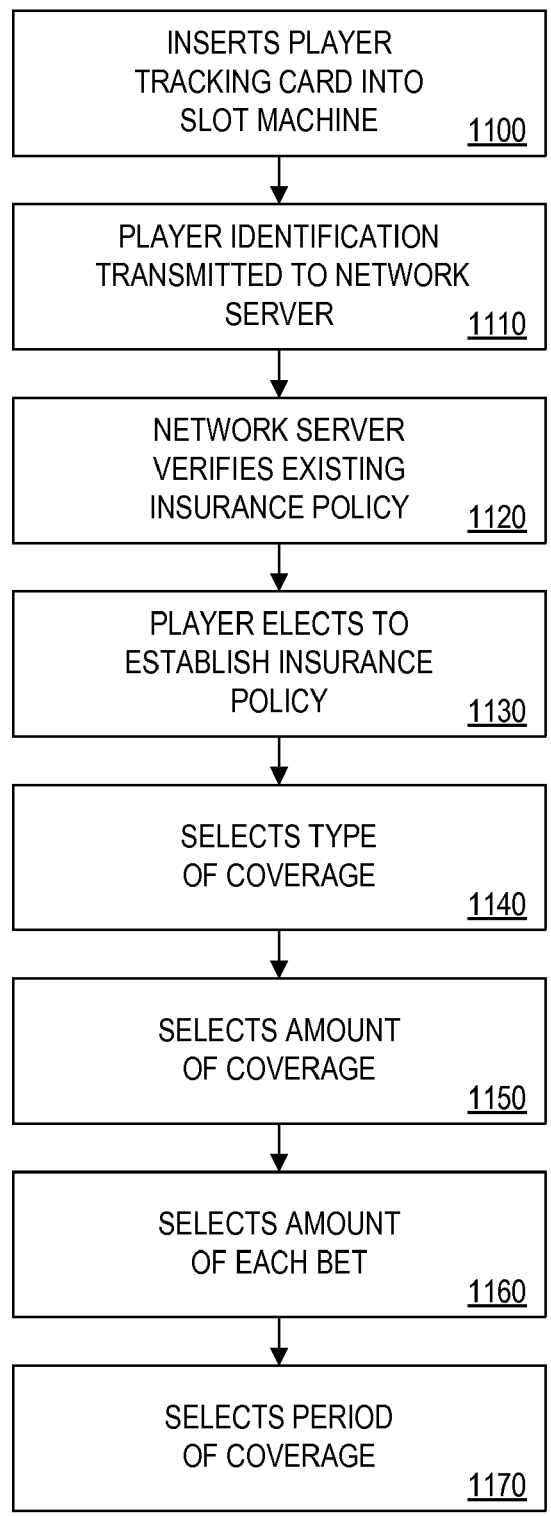
FIG. 11 is a flowchart illustrating a preferred process for determining whether an insurance adjustment is necessary pursuant to the results of the gambling session of FIG. 10.

When network server 200 receives the session record from slot machine 500, it processes the data under the insurance policy. FIG. 11 is a flowchart illustrating a preferred process for determining whether an insurance adjustment is necessary. First, network server 200 searches insurance database 250 for the player ID (step 1100). If the player ID number is not found in insurance database 250 (step 1110), no insurance adjustment is necessary because the player does not have an active policy (step 1120).

If the player ID is found in insurance database 250, network server 200 accesses insurance database 250 to see whether the insurance policy is currently active (step 1130). If the insurance policy is not currently active, no insurance adjustment is necessary, and the player is appropriately notified (step 1140). If the insurance policy is "active," however, and if these gambling results conclude the coverage period specified in the insurance policy, an insurance adjustment, or payout, is necessary (step 1150). Additionally, the result field in insurance database 250 is updated with the current slot machine session result (step 1160).

Figure 12:
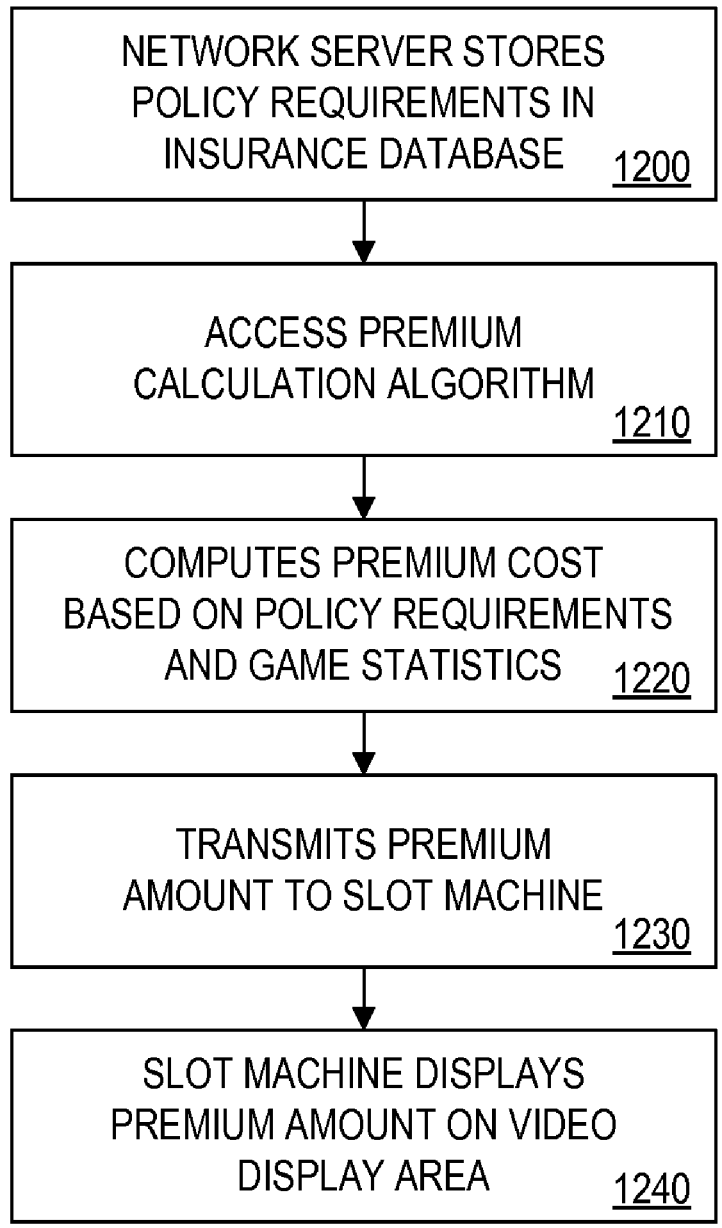
FIG. 12 is a flowchart illustrating a preferred process for transmitting a payout to the player.

FIG. 12 is a flowchart illustrating a preferred process for transmitting an insurance payout to the player. To make a payout, network server 200 first analyzes the results stored in the gambling session results field of insurance database 250 (step 1200). If the loss does not exceed the loss threshold stored in insurance database 250, no insurance adjustment is necessary. If the loss meets or exceeds the specified threshold, CPU 205 of network server 200 calculates an appropriate insurance payout amount due the player according to the insurance policy requirements (step 1210). Once the insurance payout amount is calculated, the payout is made according to the method specified in the complimentary information field of player database 245.

Figure 13:
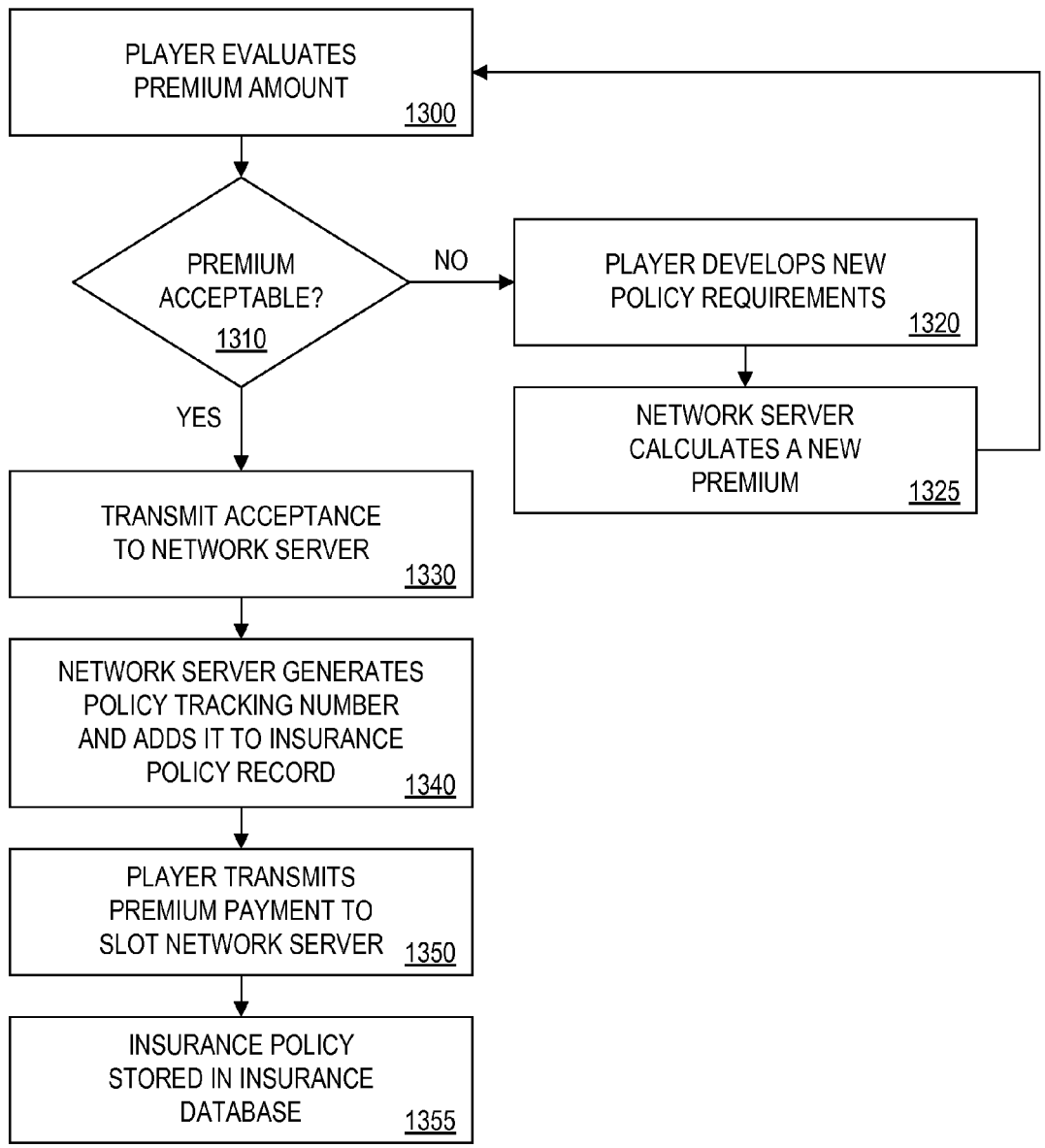
FIG. 13 is a flowchart illustrating a process according to one or more embodiments of the present invention for finalizing the purchase of the insurance policy.

FIG. 13 is a flowchart illustrating a process consistent with various embodiments of the invention for finalizing the purchase of an insurance policy. The player evaluates the premium cost shown on display 331 (or video display area 315) and decides whether the premium cost is acceptable (step 1300). If the premium is not acceptable to the player (step 1310), the player may develop new policy requirements (step 1320). For example, if the premium is too high, the player may increase the loss amount covered or may shorten the time period covered by the policy. Network server 200 then calculates a new premium cost based on the modified policy requirements (step 1325) (e.g., as described in connection with FIG. 7). This new premium amount is then transmitted to slot machine 300 for display to the player.

If the premium is acceptable to the player (step 1310), the player transmits an indication of his acceptance to network server 200, providing a confirmation to purchase the specified insurance policy (step 1330). Network server 200 preferably stores the premium amount in a database, such as in the total premium field 760 (FIG. 7) of the exemplary insurance policy database 255. Next, network server 200 generates a tracking number or other insurance policy identifier and appends it to the insurance policy record as shown in the tabular representation 700 (FIG. 7) (step 1340). Network server 200 receives the premium (or a predetermined portion thereof) from the player by directly debiting the player's credit card account, accepting coins deposited by the player, and/or debiting the player's winnings accrued at slot machine 300 (step 850). Once sufficient payment is received for the premium, network server 200 stores the insurance policy record in insurance policy database 255 (step 855).

According to one or more embodiments of the present invention, at this point, network server 200 may also create an entry in the insurance policy status database 265 and set policy status 920 (FIG. 9) to "open".

According to some alternative embodiments of the present invention, some or all of the described steps for finalizing a purchase may be carried out by the slot machine 300. For example, slot machine 300 may include an insurance database for tracking information about an insurance policy of a player.

Figure 14:
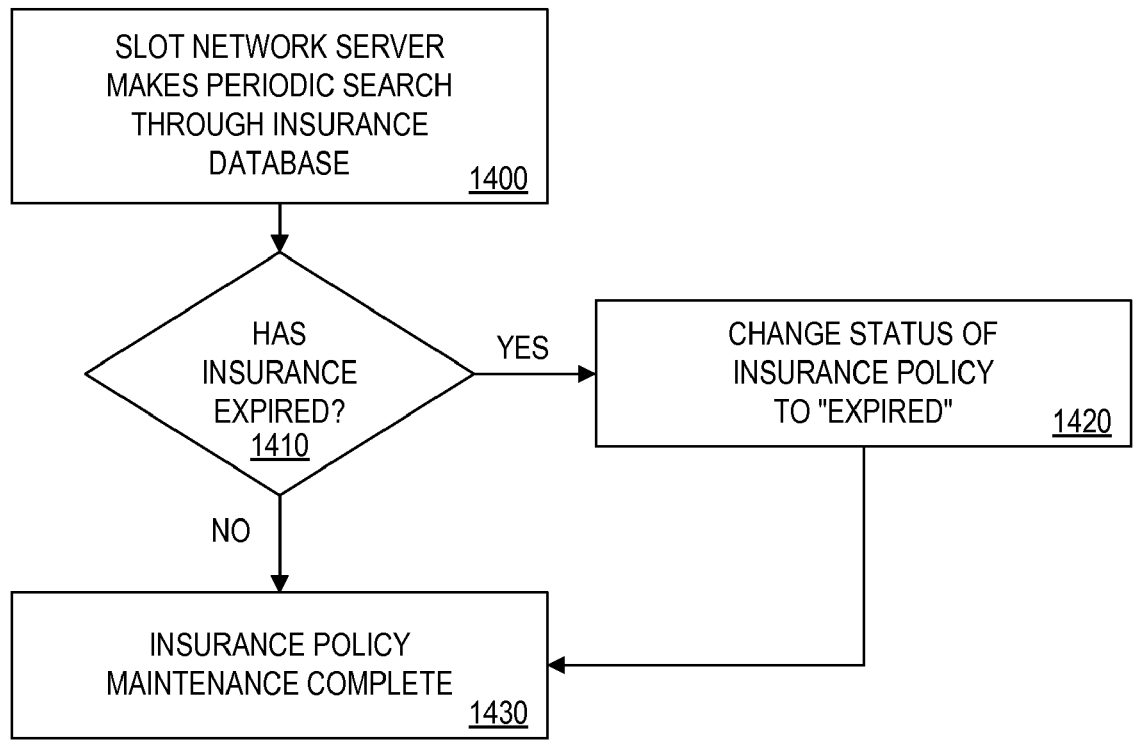
FIG. 14 is a flowchart illustrating a process according to one or more embodiments of the present invention for system maintenance of active insurance policies.

According to one or more embodiments of the present invention, network server 200 preferably performs maintenance checks to ensure that only active insurance policies are stored in the insurance policy database 255. FIG. 14 is a flowchart illustrating a preferred process for maintaining active insurance policies. First, network server 200 makes periodic searches through the insurance policy database 255, retrieving the coverage period of each insurance policy (step 1300). For example, for each entry in the insurance policy database 255, network server 200 may cross-reference the term identifiers 730, 740, 750 with the terms stored in the insurance term database 250 in order to determine the period covered by the insurance policy. CPU 205 checks whether the insurance has expired by comparing the coverage period with the current date and time (step 1310). If the current date and time are beyond the coverage period, network server 200 changes the policy status field 920 of the corresponding entry in the insurance policy status database 265 to indicate the policy is "closed" or "expired" (step 1320). For insurance policies with a period of coverage defined by a number of handle pulls, CPU 205 checks to see whether the number of outcomes received exceeds the amount of coverage. This completes the insurance policy maintenance (step 1330).

Figure 15:
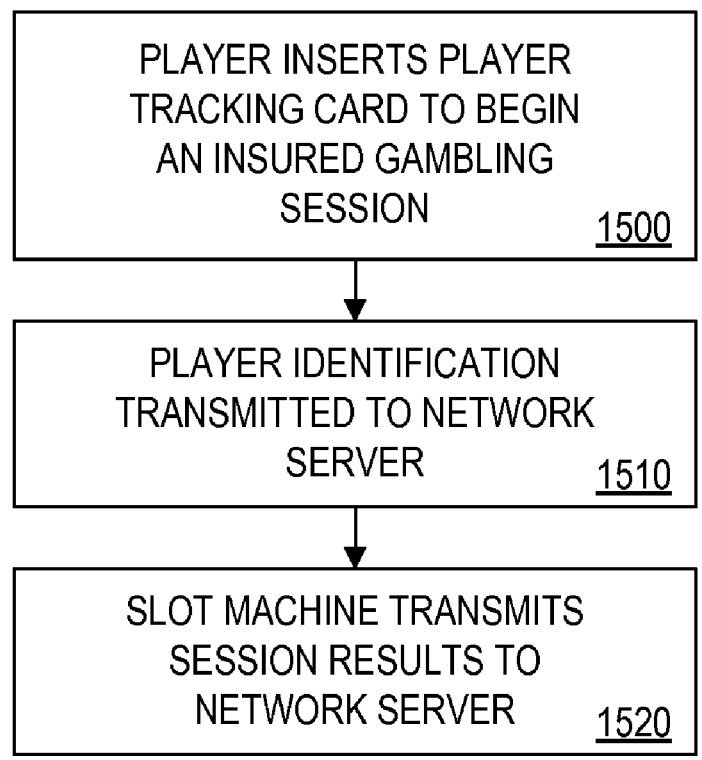
FIG. 15 is a flowchart illustrating a process according to one or more embodiments of the present invention for facilitating a gambling session.

Once an "open" or "active" insurance policy is stored in insurance policy database 255, the player may conduct an insured gambling session under the insurance policy as shown in the exemplary process depicted in FIG. 15. According to one or more embodiments of the present invention, to begin an insured gambling session, the player inserts the player tracking card into player card tracking device 330 of slot machine 300 (step 1500). Slot machine 300 then transmits the player ID number stored on (or otherwise indicated by) the player tracking card to network server 200 (step 1510). If network server 200 determines that the player has an active insurance policy in insurance policy database 255, CPU 205 of network server 200 starts storing the player's gaming results (e.g., in the gambling session database 260). Alternatively, network server 200 may store an indication of the player's gambling activity regardless of whether the player has an active policy or not.

According to some embodiments of the present invention, the administration of a player's insurance policy across multiple gaming machines may include offering additional coverage when a player resumes play at a different machine. For example, a player moving from a $0.25 machine to a $1.00 machine may be offered (and/or required to purchase) an increased amount of coverage, and may be notified of any appropriate change in premium required by the increased minimum wager amount. A player may thus be able to buy any available additional coverage or otherwise modify an existing policy based on the characteristics of the current machine. Conversely, coverage and/or premiums may be decreased if a player moves to a different machine.

Figure 16:
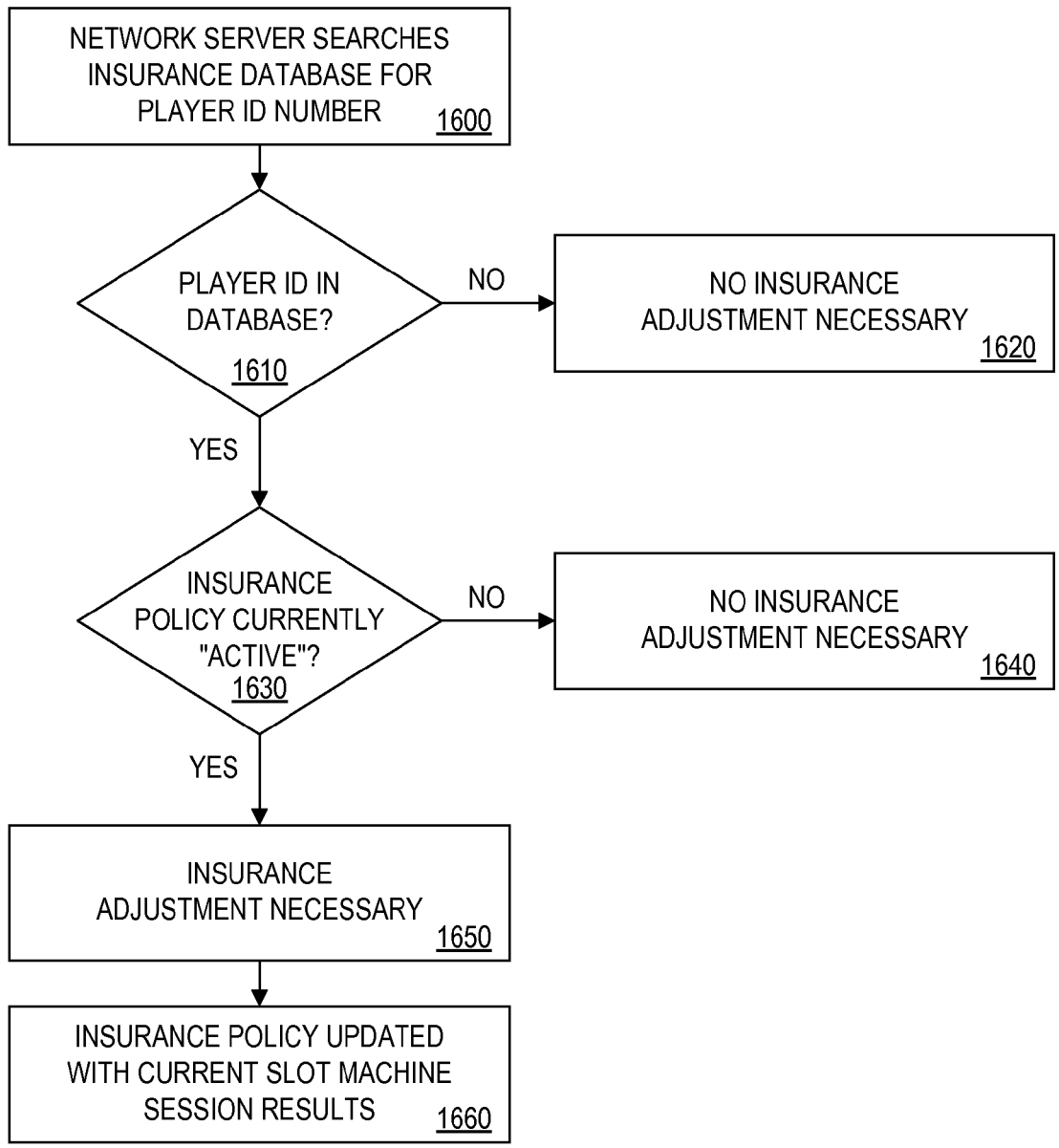
FIG. 16 is a flowchart illustrating a process according to one or more embodiments of the present invention for determining whether an insurance payout is necessary pursuant to activity of a gambling session.

According to one or more embodiments of the present invention, when network server 200 receives the session record from slot machine 300, it processes the data under the insurance policy. FIG. 16 is a flowchart illustrating a preferred process for determining whether an insurance adjustment is necessary. First, network server 200 searches insurance policy database 255 for the player ID (step 1600). If the player ID number is not found in insurance policy database 255 (step 1610), no insurance adjustment is necessary because the player does not have an active policy (step 1620).

If the player ID is found in insurance policy database 255, network server 200 accesses insurance policy status database 265 to see whether the insurance policy is currently active (step 1630). If the insurance policy is not currently active, no insurance adjustment is necessary, and the player is appropriately notified (step 1640). If the insurance policy is "active" or "open", however, and if these gambling results occurred during the coverage period specified in the insurance policy, an insurance adjustment, or payout, is necessary (step 1650). Additionally, the corresponding gambling session entry in gambling session database 260 may be updated with the current slot machine session result (step 1660).

Figure 17:
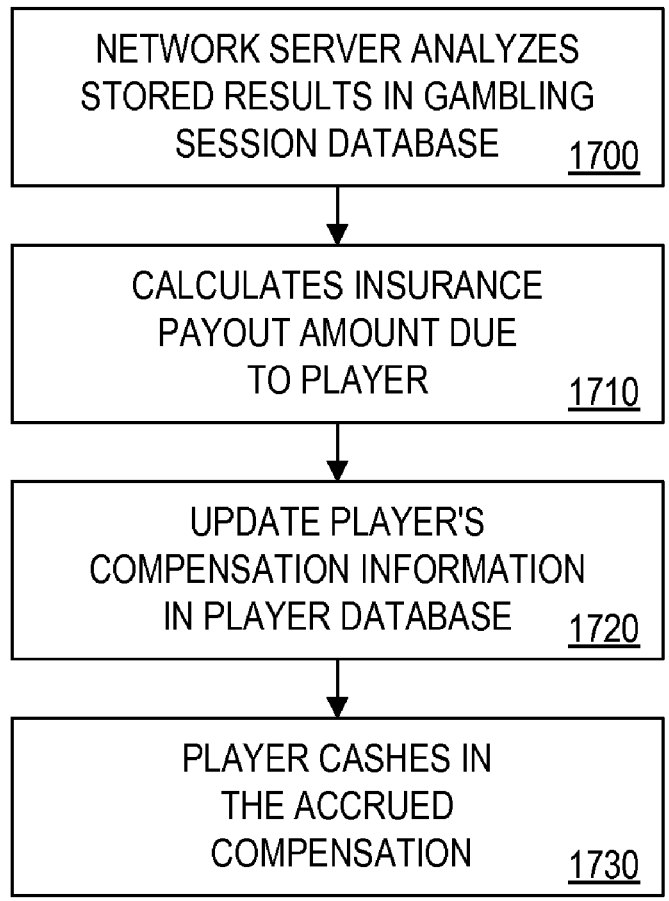
FIG. 17 is a flowchart illustrating a process according to one or more embodiments of the present invention for providing an insurance payout to a player.

FIG. 17 is a flowchart illustrating a preferred process for transmitting an insurance payout (or other benefit) to the player. To make a payout, network server 200 first analyzes the results stored in the appropriate gambling session entry of gambling session database 960 (step 1700). For example, if a loss during the gambling session does not exceed the loss threshold as indicated in insurance policy database 255 (e.g., as represented by the stored term identifiers 730, 740, 750), no insurance adjustment is necessary. If the loss meets or exceeds the specified threshold, CPU 205 of network server 200 calculates an appropriate insurance payout amount due the player according to the insurance policy requirements (step 1710). Once the insurance payout amount is calculated, the payout may be made according to a method specified by one or more terms of the policy.

In the preferred embodiment, network server 200 updates the insurance payout amount 940, 950 of insurance policy status database 265 (step 1720). Thereafter, the player may collect the insurance payout at any time at a cashier's station (step 1730). Paying the player at a location away from a gaming machine or table game may help discourage players from immediately spending the payout, and may be a preferred option amongst the players. Alternatively, the player may choose to transfer the payout directly to his credit card. In that case, network server 200 directly credits the player's credit card by the amount of the payout. Additionally, the player may choose to transmit the payout directly to slot machine 300, in which case the compensation may be disbursed through the payout tray of slot machine 300. Regardless of the payout method, network server 200 preferably updates insurance policy status database 265 to reflect that a payment has been made (e.g., by modifying policy status 920 to indicate a payout amount has been "paid" and/or by updating insurance payout time/date 970 with a time of the payout).

In the preferred embodiment, network server 200 updates the earned payout field of player database 245 (step 1220). Thereafter, the player may collect the insurance payout at any time at a cashier's station (step 1230). Paying the player at a location away from a gaming machine or table game helps discourage players from immediately spending the payout and may be a preferred option amongst the players. Alternatively, the player may choose to transfer the payout directly to his credit card. In that case, network server 200 directly credits the player's credit card by the amount of the payout. Additionally, the player may choose to transmit the payout directly to slot machine 500, in which case the compensation is disbursed through the payout tray of slot machine 500. Regardless of the payout method, network server 200 updates insurance database 250 to reflect that a payment has been made.

CONCLUSION

Systems and methods consistent with the present invention provide gambling loss insurance policies to players and offer protection against unpredictable gambling losses. Additionally, such systems and methods provide a way of automatically processing gambling sessions covered by the gambling loss insurance policies.

It will be apparent to those skilled in the art that various modifications and variations can be made in the present invention and a construction of the invention without departing from the scope or spirit of the invention. Other embodiments of the invention will be apparent to those skilled in the art from consideration of the specification and practice of the invention disclosed herein. The specification and examples should be considered as exemplary only, with the true scope and spirit of the invention indicated by the following claims.

What is claimed is:

1. A gaming system comprising:
    (a) at least one display device;
    (b) at least one input device;
    (c) at least one processor; and
    (d) at least one memory device which stores a plurality of instructions which, when executed by the at least one processor, cause the at least one processor to operate with the at least one display device and the at least one input device to:

(i) determine an insurance premium cost, from a plurality of different insurance premium costs, associated with a gambling loss insurance policy;

(ii) receive a confirmation to purchase the gambling loss insurance policy, the confirmation received from a player;

(iii) receive a payment for the insurance premium cost, wherein the payment is distinct from the confirmation and in addition to any wager amount;

(iv) determine an amount of loss generated by the player during a game play; and (v) determine a refund based on the amount of loss and the gambling loss insurance policy.

2. The gaming system of claim 1 wherein the payment is temporally distinct from the confirmation.

3. The gaming system of claim 1 wherein the payment is physically distinct from the confirmation such that the player must perform two distinct actions to provide the confirmation and the payment.

4. The gaming system of claim 1 wherein when executed by the at least one processor, the plurality of instructions further cause the at least one processor to provide the refund to the player.

5. The gaming system of claim 1, wherein when executed by the at least one processor, the plurality of instructions cause the at least one processor to determine the insurance premium cost based on at least one player-defined parameter.

6. The gaming system of claim 1, wherein when executed by the at least one processor, the plurality of instructions cause the at least one processor to receive the confirmation through a device.

7. The gaming system of claim 1, wherein when executed by the at least one processor, the plurality of instructions cause the at least one processor to receive the confirmation at a cashier's station.

8. The gaming system of claim 1, wherein when executed by the at least one processor, the plurality of instructions cause the at least one processor to receive the payment through at least one of: a device, a casino representative or a cashier's station.

9. The gaming system of claim 1, wherein when executed by the at least one processor, the plurality of instructions cause the at least one processor to define at least one parameter associated with the gambling loss insurance policy.

10. The gaming system of claim 1, wherein when executed by the at least one processor, the plurality of instructions cause the at least one processor to cause an output at a device of an option to purchase the gambling loss insurance policy.

11. The gaming system device of claim 1, wherein when executed by the at least one processor, the plurality of instructions cause the at least one processor to receive a payment for the insurance premium cost by debiting an account associated with the player.

12. The gaming system of claim 1, wherein when executed by the at least one processor, the plurality of instructions cause the at least one processor to receive a payment for the insurance premium cost by debiting a credit balance on a device, the device being associated with the player.

13. The gaming system of claim 1, wherein when executed by the at least one processor, the plurality of instructions cause the at least one processor to receive a payment for the insurance premium cost in the form of currency from the player.

14. The gaming system device of claim 1, wherein when executed by the at least one processor, the plurality of instructions cause the at least one processor to register the player after the confirmation to purchase the gambling loss insurance policy is received.

15. The gaming system devise of claim 1, wherein when executed by the at least one processor, the plurality of instructions cause the at least one processor to transmit the insurance premium cost to a device and display information relating to the insurance premium cost to the player through the device.

16. The gaming system of claim 1, wherein when executed by the at least one processor, the plurality of instructions cause the at least one processor to transmit the confirmation to a device.

17. The gaming system of claim 1, wherein when executed by the at least one processor, the plurality of instructions cause the at least one processor to receive information related to receiving the payment.

18. The gaming system of claim 1, wherein the gaming system comprises at least one of a gaming device operable to facilitate a wagering game, a server operatively connected to the gaming device and a handheld portable device operable to facilitate a wagering game.

19. The gaming system of claim 1, which includes a first device and a second device, wherein when executed by the at least one processor, the plurality of instructions cause the at least one processor to cause the first device to:

(i) output an option at the second device to purchase the gambling loss insurance policy;

(ii) cause the second device to determine the insurance premium cost;

(iii) cause the second device to receive the confirmation to purchase the gambling loss insurance policy, the confirmation received from player; and (iv) cause the second device to receive payment for the insurance premium cost for the gambling loss insurance policy, wherein the payment is distinct from the confirmation and in addition to any wager amount.

20. The gaming system of claim 1, which includes a first device, wherein when executed by the at least one processor, the plurality of instructions cause the at least one processor to cause the first device to:

(a) determine the insurance premium cost, from a plurality of different insurance premium costs, associated with a gambling loss insurance policy;

(b) receive the confirmation to purchase the gambling loss insurance policy, the confirmation received from a player; and (c) receive the payment for the insurance premium cost, wherein the payment is distinct from the confirmation and in addition to any wager amount.

21. The gaming system of claim 1, wherein the game play comprises at least one play of a game.

22. The gaming system of claim 4, wherein when executed by the at least one processor, the plurality of instructions cause the at least one processor to provide the refund to the player at a cashier station.

23. The gaming system of claim 4, wherein when executed by the at least one processor, the plurality of instructions cause the at least one processor to provide the refund to the player at a device.

24. The gaming system of claim 4, wherein when executed by the at least one processor, the plurality of instructions cause the at least one processor to provide the refund to the player as a credit to an electronic account associated with the player.

25. The gaming system of claim 4, wherein when executed by the at least one processor, the plurality of instructions cause the at least one processor to provide a preferred manner through which to provide the refund to the player.

26. The gaming system of claim 4, wherein when executed by the at least one processor, the plurality of instructions cause the at least one processor to update an insurance database to reflect the refund being provided to the player.

27. The gaming system of claim 25, wherein when executed by the at least one processor, the plurality of instructions further cause the at least one processor to reference at least one player preference associated with the player to determine the preferred manner through which to provide the refund to the player.

28. The gaming system of claim 5, wherein when executed by the at least one processor, the plurality of instructions cause the at least one processor to receive the at least one player-defined parameter from the player.

29. The gaming system of claim 28, wherein the at least one player-defined parameter comprises at least one of: a loss at which the gambling loss insurance policy pays a claim, an amount of a bet, and a time period over which the gambling loss insurance policy is in effect.

30. The gaming system of claim 9 wherein the at least one parameter comprises at least one of: a timer period during which the gambling loss insurance policy is in effect, a number of game plays for which the gambling loss insurance policy is in effect, a wager amount per game play, a coverage amount, a type of gaming device, and a threshold of losses above which the refund is paid.

31. The gaming system of claim 9, wherein when executed by the at least one processor, the plurality of instructions cause the at least one processor to define the parameters using a phone.

32. The gaming system of claim 30 wherein the coverage amount is based on either a percentage of losses or a fixed amount.

33. A non-transitory computer readable medium which stores instructions which, when executed by at least one processor, cause the at least one processor to:
(a) receive a confirmation to purchase a gambling loss insurance policy, the confirmation received from a player;
(b) determine an insurance premium cost, from a plurality of different insurance premium costs, associated with the gambling loss insurance policy;
(c) receive a payment for the insurance premium cost, wherein the payment is distinct from the confirmation and in addition to any wager amount;
(d) determine an amount of loss generated by the player during game play; and
(e) determine a refund based on the amount of loss and the gambling loss insurance policy.

34. The non-transitory computer readable medium of claim 33, wherein the game play comprises at least one play of a game.

35. The gaming system of claim 20, which includes a second device, wherein when executed by the at least one processor, the plurality of instructions cause the at least one processor to cause the second device to:
(a) determine the amount of loss generated by the player during the game play;
(b) determine the refund based on the amount of loss and the gambling loss insurance policy; and
(c) provide the determined refund to the player.

* * * * *